United States Patent
Ibrahim et al.

(10) Patent No.: US 7,617,252 B2
(45) Date of Patent: Nov. 10, 2009

(54) COMPENSATING FOR UNAVAILABILITY IN A STORAGE VIRTUALIZATION SYSTEM

(75) Inventors: Rahim Ibrahim, Mountain View, CA (US); Tuan Nguyen, San Jose, CA (US); Ashish Shah, San Ramon, CA (US); Ranjit Ghate, Oakland, CA (US); Chan Ng, San Jose, CA (US); Gen-Hwa Chiang, Milpitas, CA (US)

(73) Assignee: NetApp, Inc., Sunnyvale, CA (US)

( * ) Notice: Subject to any disclaimer, the term of this patent is extended or adjusted under 35 U.S.C. 154(b) by 137 days.

(21) Appl. No.: 11/420,781

(22) Filed: May 29, 2006

(65) Prior Publication Data

US 2006/0206494 A1 Sep. 14, 2006

Related U.S. Application Data

(63) Continuation of application No. 10/238,804, filed on Sep. 9, 2002, now Pat. No. 7,171,434.

(60) Provisional application No. 60/317,817, filed on Sep. 7, 2001.

(51) Int. Cl.
 *G06F 17/30* (2006.01)
(52) U.S. Cl. .................................. 707/200; 707/10
(58) Field of Classification Search .............. 707/10, 707/200
 See application file for complete search history.

(56) References Cited

U.S. PATENT DOCUMENTS 5,892,900 A * 4/1999 Ginter et al. ............... 726/26
5,999,931 A * 12/1999 Breitbart et al. ............. 707/10
6,044,403 A * 3/2000 Gerszberg et al. .......... 709/225
6,463,446 B1 * 10/2002 Wollrath et al. ............ 707/203
6,536,037 B1 * 3/2003 Guheen et al. ............. 717/151
6,615,166 B1 * 9/2003 Guheen et al. ............. 703/27
6,654,747 B1 * 11/2003 Van Huben et al. ......... 707/10
6,799,255 B1 * 9/2004 Blumenau et al. .......... 711/152
6,834,214 B2 * 12/2004 Davison et al. ............. 700/181
6,865,737 B1 * 3/2005 Lucas et al. ................ 717/178
6,898,670 B2 * 5/2005 Nahum ...................... 711/114
7,076,652 B2 * 7/2006 Ginter et al. ............... 713/153
7,145,898 B1 * 12/2006 Elliott ....................... 370/352
7,167,450 B2 * 1/2007 Kato et al. ................. 370/236
7,428,540 B1 * 9/2008 Coates et al. .............. 707/10
2002/0046209 A1 * 4/2002 De Bellis .................. 707/10

* cited by examiner

*Primary Examiner*—Don Wong
*Assistant Examiner*—Kim T Nguyen
(74) *Attorney, Agent, or Firm*—Leland Wiesner; Wiesner and Associates

(57) ABSTRACT

A storage virtualization system for accessing at least one storage device for a virtual logical unit (VLUN) from at least one host. The system includes at least one upstream processing element (UPE) which is adapted for coupling to a corresponding host server. The system is further adapted for coupling to at least one storage device. The controller also includes a primary central processing element (CPE) that can be configurably coupled to the UPEs. The primary CPE permits data transfer to occur between a host and a storage device via the corresponding UPE. The controller further includes a backup CPE that can be configurably coupled to the UPEs. The backup CPE is configurable to permit the data transfer when the primary CPE becomes unavailable.

20 Claims, 12 Drawing Sheets

COMPENSATING FOR UNAVAILABILITY IN A STORAGE VIRTUALIZATION SYSTEM

CROSS-REFERENCE TO RELATED APPLICATIONS

This application claims priority to U.S. Provisional Application No. 60/317817, filed Sep. 7, 2001 and titled "Method & Apparatus for Processing fiber Channel Frames at Wire Speed", which is incorporated herein by reference and is a continuation under 35 USC 120 of U.S. patent application Ser. No. 10/238,804, filed Sep. 9, 2002, now U.S. Pat. No. 7,171,434, and titled "DETECTING UNAVAILABILITY OF PRIMARY CENTRAL PROCESSING ELEMENT, EACH BACKUP CENTRAL PROCESSING ELEMENT ASSOCIATED WITH A GROUP OF VIRTUAL LOGIC UNITS AND QUIESCING I/O OPERATIONS OF THE PRIMARY CENTRAL PROCESSING ELEMENT IN A STORAGE VIRTUALIZATION SYSTEM", by Ranjit Ghate, Rahim Ibrahim, Tuan Nguyen, Ashish Shah, Chan Ng, and Gen-Hwa Chiang and assigned to the assignee of the present invention. This application also relates to the subject matter disclosed in U.S. Pat. No. 7,330,892 by Ibrahim et al. titled "High-Speed Data Transfer in a Storage Virtualization Controller", which is hereby incorporated by reference in its entirety.

BACKGROUND OF THE INVENTION

Storage area networks, also known as SANs, facilitate sharing of storage devices with one or more different host server computer systems and applications. Fibre channel switches (FCSs) can connect host servers with storage devices creating a high speed switching fabric. Requests to access data pass over this switching fabric and onto the correct storage devices through logic built into the FCS devices. Host servers connected to the switching fabric can quickly and efficiently share blocks of data stored on the various storage devices connected to the switching fabric.

Storage devices can share their storage resources over the switching fabric using several different techniques. For example, storage resources can be shared using storage controllers that perform storage virtualization. This technique can make one or more physical storage devices, such as disks, which comprise a number of logical units (sometimes referred to as "physical LUNs") appear as a single virtual logical unit or multiple virtual logical units, also known as VLUNs. By hiding the details of the numerous physical storage devices, a storage virtualization system having one or more such controllers advantageously simplifies storage management between a host and the storage devices. In particular, the technique enables centralized management and maintenance of the storage devices without involvement from the host server.

In many instances it is advantageous to place the storage virtualization controller(s) in the middle of the fabric, with the host servers and controllers arranged at the outer edges of the fabric. Such an arrangement is generally referred to as a symmetric, in-band, or in-the-data-path configuration. Since such a storage virtualization system is integral to the operation of the storage area network, the unavailability or failure of part or all of a storage virtualization controller can be problematic, resulting in an inability of a host server to communicate with a storage device associated with its VLUN.

For these and other reasons, there is a need for the present invention.

BRIEF DESCRIPTION OF THE DRAWINGS

The features of the present invention and the manner of attaining them, and the invention itself, will be best understood by reference to the following detailed description of embodiments of the invention, taken in conjunction with the accompanying drawings, wherein.

SUMMARY OF THE INVENTION

Figure 1:
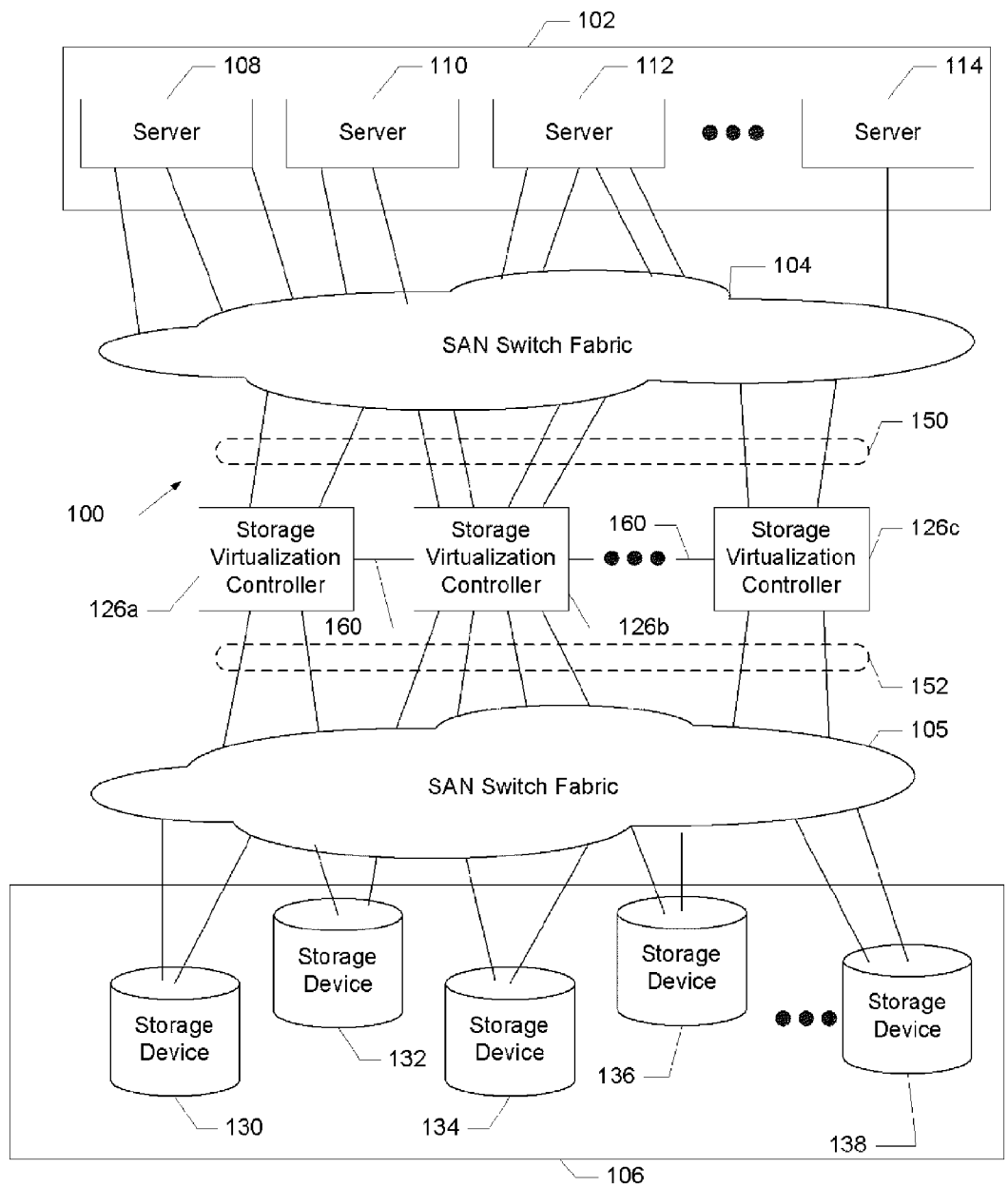
FIG. 1 is an exemplary system block diagram of the logical relationship between host servers, storage devices, and a storage area network (SAN) implemented using a switching fabric along with an embodiment of the present invention.

In one embodiment the present invention provides a storage virtualization system for accessing at least one storage device for a VLUN from at least one host. The system includes at least one upstream processing element (UPE) which is adapted for coupling to a corresponding host server. The system is further adapted for coupling to at least one storage device. The controller also includes a primary CPE that can be configurably coupled to the UPEs. The primary CPE permits data transfer to occur between a host and a storage device via the corresponding UPE. The controller further includes a backup CPE that can be configurably coupled to the UPEs. The backup CPE is configurable to permit the data transfer when the primary CPE becomes unavailable.

The present invention may also be implemented as a method of operating a storage virtualization controller arrangement. In the method, at least two central processing elements disposed in the controller arrangement are provided. The controller arrangement is configured to connect to at least one host and at least one storage device. One of the central processing elements is assigned as a primary central processing element to arbitrate access from the host(s) to the storage device(s). Upon detection of the unavailability of the primary central processing element, a different one of the central processing elements is automatically reassigned as a backup central processing element to arbitrate the access from the host(s) to the storage device(s).

DESCRIPTION OF THE PREFERRED EMBODIMENT

Referring now to the drawings, there is illustrated an embodiment of a storage virtualization system constructed in accordance with the present invention which can continue to allow data to be transferred between at least one host, such as a server, and at least one storage device connected to the system, even when a portion of the system becomes unavailable. Each host can be connected to an upstream processing element (UPE) of the system, and the storage device(s) can also be connected to the system. In operation, a primary central processing element (CPE) of the system can be configurably coupled to one or more UPEs to grant permission for the UPE to transfer the data between the host and the storage device. If and when the primary CPE becomes unavailable, a backup CPE of the system can be configurably coupled to at least some of these UPEs to permit the data transfer to continue despite the unavailability of the primary CPE. One such system uses a virtual storage exchange (VSX) device designed by Confluence Networks, Incorporated of Milpitas, Calif. (VSX is a trademark of Confluence Networks, Incorporated).

As best understood with reference to the exemplary configuration of FIG. 1, a storage area network (SAN) 100 may include one or more SAN switch fabrics, such as fabrics 104,105. Fabric 104 is connected to hosts 102, while fabric 105 is connected to storage devices 106. At least one storage virtualization controller 126 is inserted in the midst of SAN 100, and connected to both fabrics 104,105 to form a symmetric, in-band storage virtualization configuration. In an in-band configuration, communications between server devices 102 and storage devices 106 pass through controller 126 for performing data transfer in accordance with the present invention.

Host servers 102 are generally communicatively coupled (through fabric 104) via links 150 to individual UPEs of controller 126. In an alternate configuration, one or more host servers may be directly coupled to controller 126, instead of through fabric 104. Controller 126 includes at least one UPE for each server 102 (such as host servers 108,110,112,114) connected to the controller 126. As will be discussed subsequently in greater detail, storage virtualization controller 126 appears as a virtual logical unit (VLUN) to each host server.

Storage devices 106 are communicatively coupled (through fabric 105) via links 152 to individual downstream processing elements (DPEs) of controller 126. In an alternate configuration, one or more storage devices may be directly coupled to controller 126, instead of through fabric 105. Controller 126 includes at least one DPE for each storage device 106 (such as storage devices 130,132,134,136,138) connected to the controller 126. Controller 126 appears as an initiator to each storage device 106. Multiple controllers 126 may be interconnected by external communications link 160.

Figure 2:
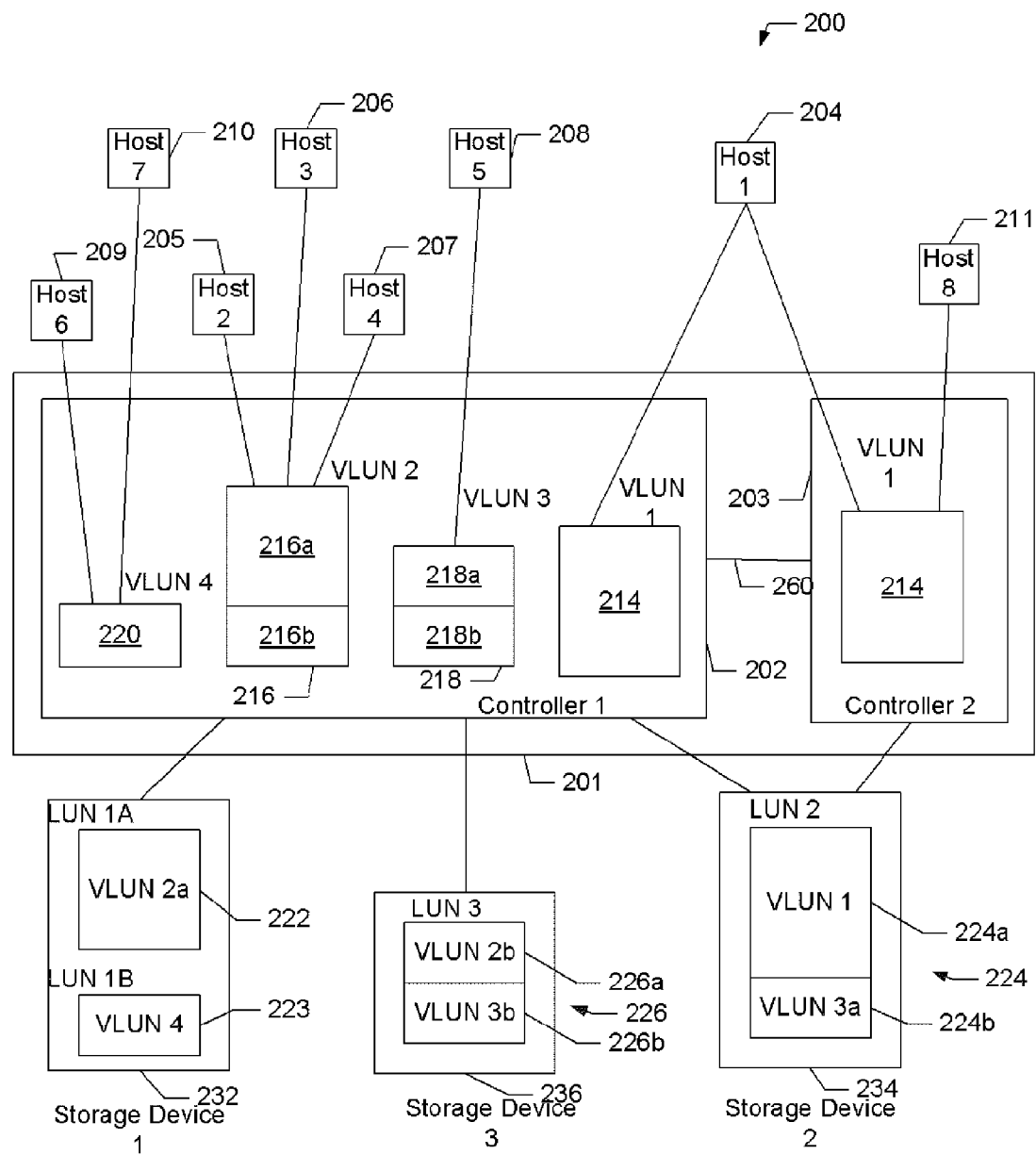
FIG. 2 is an exemplary system block diagram illustrative of the relationship provided by a storage virtualization controller between virtual logical units and logical units on physical storage devices, in accordance with an embodiment of the present invention.

Considering now the virtualization of storage provided by an embodiment of the present invention, and with reference to the exemplary SAN 200 of FIG. 2, a storage virtualization system includes an exemplary storage virtualization controller arrangement 201. Controller arrangement 201 includes, for illustrative purposes, two storage virtualization controllers 202,203 interconnected via communication link 260. Controller1 202 has been configured to provide four virtual logical units 214,216,218,220 associated with hosts 204-210, while controller2 203 has been configured to provide one virtual logical unit 214 associated with hosts 204,211. In the general case, a virtual logical unit (VLUN) includes N "slices" of data from M physical storage devices, where a data "slice" is a range of data blocks. In operation, a host requests to read or write a block of data from or to a VLUN. Through Controller1 202 of this exemplary configuration, host1 204 is associated with VLUN1 214; host2 205, host3 206, and host4 207 are associated with VLUN2 216; host5 208 and host6 209 are associated with VLUN3 218, and host7 210 is associated with VLUN4 220. Through controller2 203, host1 204 and host8 211 are also associated with VLUN1 214. It can be seen that host1 204 can access VLUN1 214 through two separate paths, one through controller1 202 and one path through controller2 203; this configuration will be discussed subsequently in greater detail with reference to FIGS. 5 and 6.

A host 204-211 accesses its associated VLUN by sending commands to the controller arrangement 201 to read and write virtual data blocks in the VLUN. Controller arrangement 201 maps the virtual data blocks to physical data blocks on individual ones of the storage devices 232,234,236, according to a preconfigured mapping arrangement. Controller arrangement 201 then communicates the commands and transfers the data blocks to and from the appropriate ones of the storage devices 232,234,236. Each storage device 232, 234,236 can include one or more physical LUNs; for example, storage device 1 232 has two physical LUNs, LUN 1A 222 and LUN 1B 223.

To illustrate further the mapping of virtual data blocks to physical data blocks, all the virtual data blocks of VLUN1 214 are mapped to a portion 224a of the physical data blocks LUN2 224 of storage device 234. Since VLUN2 216 requires more physical data blocks than any individual storage device 232,234,236 has available, one portion 216a of VLUN2 216 is mapped to the physical data blocks of LUN1A 222 of storage device 232, and the remaining portion 216b of VLUN2 216 is mapped to a portion 226a of the physical data blocks of LUN3 226 of storage device 236. One portion 218a of VLUN3 218 is mapped to a portion 224b of LUN2 224 of storage device 234, and the other portion 218b of VLUN3 218 is mapped to a portion 226b of LUN3 226 of storage device 236. It can be seen with regard to VLUN3 that such a mapping arrangement allows data block fragments of various storage devices to be grouped together into a VLUN, thus advantageously maximizing utilization of the physical data blocks of the storage devices. All the data blocks of VLUN4 220 are mapped to LUN1B 223 of storage device 232.

While the above-described exemplary mapping illustrates the concatenation of data block segments on multiple storage devices into a single VLUN, it should be noted that other mapping schemes, including but not limited to striping and replication, can also be utilized by the controller arrangement 201 to form a VLUN. Additionally, the storage devices 232, 234,236 may be heterogeneous; that is, they may be from different manufacturers or of different models, and may have different storage sizes, capabilities, architectures, and the like. Similarly, the hosts 204-210 may also be heterogeneous; they may be from different manufacturers or of different models, and may have different processors, operating systems, networking software, applications software, capabilities, architectures, and the like.

It can be seen from the above-described exemplary mapping arrangement that different VLUNs may contend for access to the same storage device. For example, VLUN2 216 and VLUN4 220 may contend for access to storage device 1 232; VLUN1 214 and VLUN3 218 may contend for access to storage device 2 234; and VLUN2 216 and VLUN3 218 may contend for access to storage device 3 236. The storage virtualization controller arrangement 201 according to an embodiment of the present invention performs the mappings and resolves access contention, while allowing data transfers between the host and the storage device to occur at wire-speed.

Before considering the various elements of the storage virtualization system in detail, it is useful to discuss, with reference to FIGS. 1 and 2, the format and protocol of the storage requests that are sent over SAN 200 from a host to a storage device through the controller arrangement 201. Many storage devices frequently utilize the Small Computer System Interface (SCSI) protocol to read and write the bytes, blocks, frames, and other organizational data structures used for storing and retrieving information. Hosts access a VLUN using these storage devices via some embodiment of SCSI commands; for example, layer 4 of Fibre Channel protocol. However, it should be noted that the present invention is not limited to storage devices or network commands that use SCSI protocol.

Storage requests may include command frames, data frames, and status frames. The controller arrangement 201 processes command frames only from hosts, although it may send command frames to storage devices as part of processing the command from the host. A storage device never sends command frames to the controller arrangement 201, but only sends data and status frames. A data frame can come from either host (in case of a write operation) or the storage device (in case of a read operation).

In many cases one or more command frames is followed by a large number of data frames. Command frames for read and write operations include an identifier that indicates the VLUN that data will be read from or written to. A command frame containing a request, for example, to read or write a 50 kB block of data from or to a particular VLUN may then be followed by 25 continuously-received data frames each containing 2 kB of the data. Since data frames start coming into the controller 302 only after the controller has processed the command frame and sent a go-ahead indicator to the host or storage device that is the originator of the data frames, there is no danger of data loss or exponential delay growth if the processing of a command frame is not done at wire-speed; the host or the storage device will not send more frames until the go-ahead is received. However, data frames flow into the controller 302 continuously once the controller gives the go-ahead. If a data frame is not processed completely before the next one comes in, the queuing delays will grow continuously, consuming buffers and other resources. In the worst case, the system could run out of resources if heavy traffic persists for some time.

Figure 3:
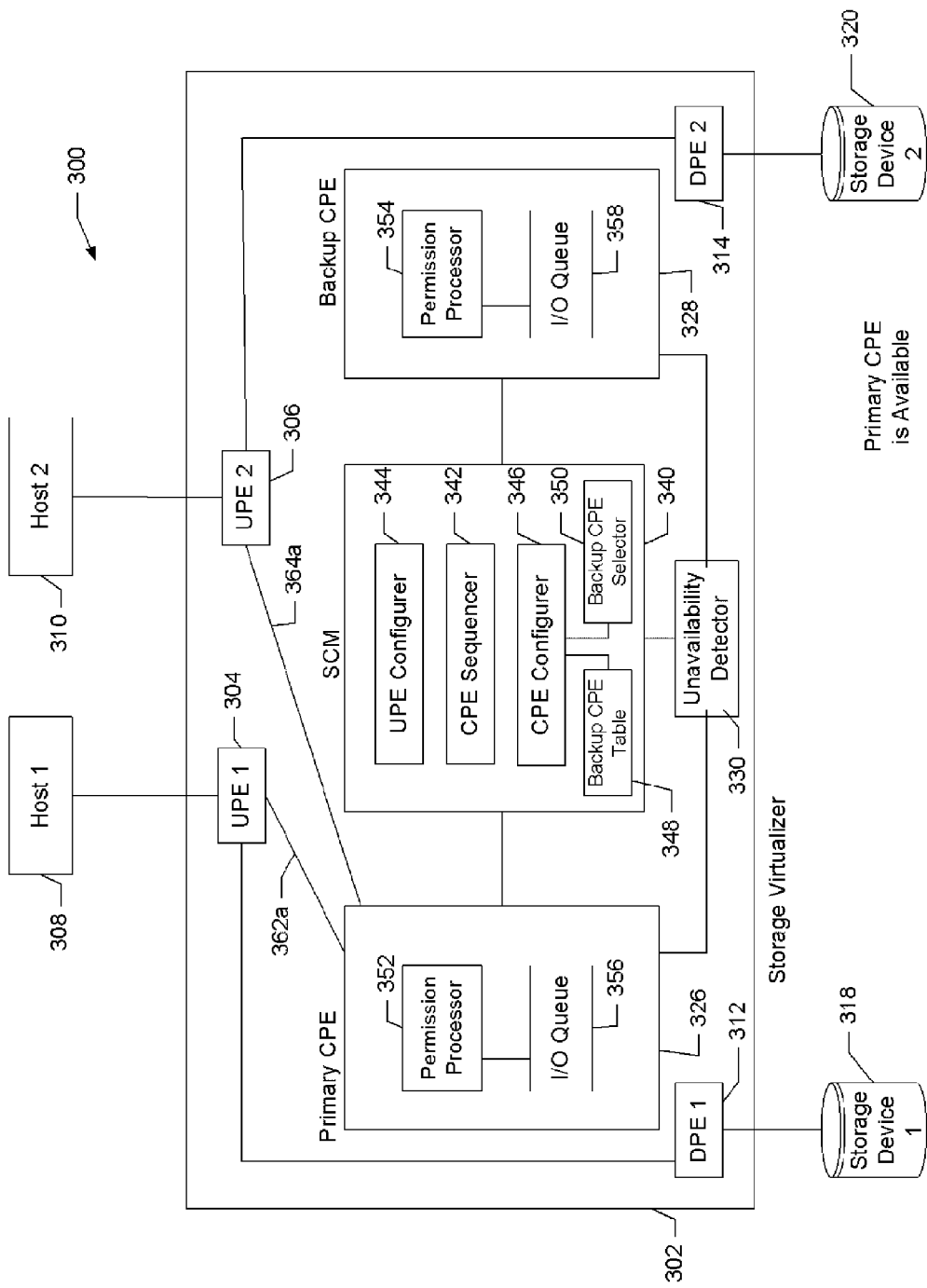
FIG. 3 is a block diagram of a storage virtualization controller according to an embodiment of the present invention and usable in the storage networks of FIGS. 1 and 2, illustrative of operation while a primary central processing element is available.

Considering now in greater detail an individual storage virtualization controller 302, and with reference to the SAN 300 of FIG. 3, the controller 302 includes at least one upstream processing element (two UPEs 304,306 are shown for clarity) adapted for connection to a corresponding one of the hosts 308,310 for transferring data between the corresponding host and its VLUN. The controller 302 also includes at least one downstream processing element (two DPEs 312, 314 are shown for clarity) each adapted for connection to a corresponding one of the storage devices 318,320. Each storage device 318,320,322 is representative of at least a portion of a VLUN. The controller 302 further includes at least two CPEs (CPEs 326 and 328 are shown for clarity). One of the CPEs, CPE 326, is configurable as a primary CPE. Primary CPE 326 is coupleable to at least some of the UPEs in the controller 302; both UPEs 304,306 are illustrated as coupled to primary CPE 326 via communications links 362a,364a respectively. Primary CPE 326 is responsible for arbitrating access to the VLUNs associated with the hosts 308,310 that are connected to the UPEs 304,306. For example, before host2 310 can transfer data to or from storage device 2 320 through the data path that includes UPE 306 and DPE 314, UPE 306 obtains permission from primary CPE 326 to perform the transfer. While SAN 300 illustrates a single primary CPE, a controller 302 may configure more than one primary CPE. The number of primary CPEs required is often based on the total number of VLUNs in the storage virtualization system, with each primary CPE arbitrating access to a subset of the total number of VLUNs.

One or more of the other, non-primary CPEs is configurable as a backup CPE. The exemplary controller 302 illustrates one backup CPE, CPE 328. While the primary CPE 326 is operating properly, backup CPE 328 does not play a role in permitting the data transfer. However, if and when primary CPE 326 becomes unavailable, backup CPE 328 can be configurably coupled to at least some of the UPEs that are coupled to primary CPE 326, and backup CPE 328 becomes responsible for permitting the data transfers for the VLUNs associated with the hosts connected to those coupled UPEs.

The controller 302 also includes an unavailability detector 330 coupled to at least the primary CPE 326. The unavailability detector 330 detects impending unavailability of the primary CPE 326 and signals a storage configuration module 340. The primary CPE 326 may become unavailable for a number of reasons, including but not limited to an elective shutdown of the primary CPE 326 by an operator of the storage area network, or a failure of the primary CPE 326 or some associated component.

Figure 4:
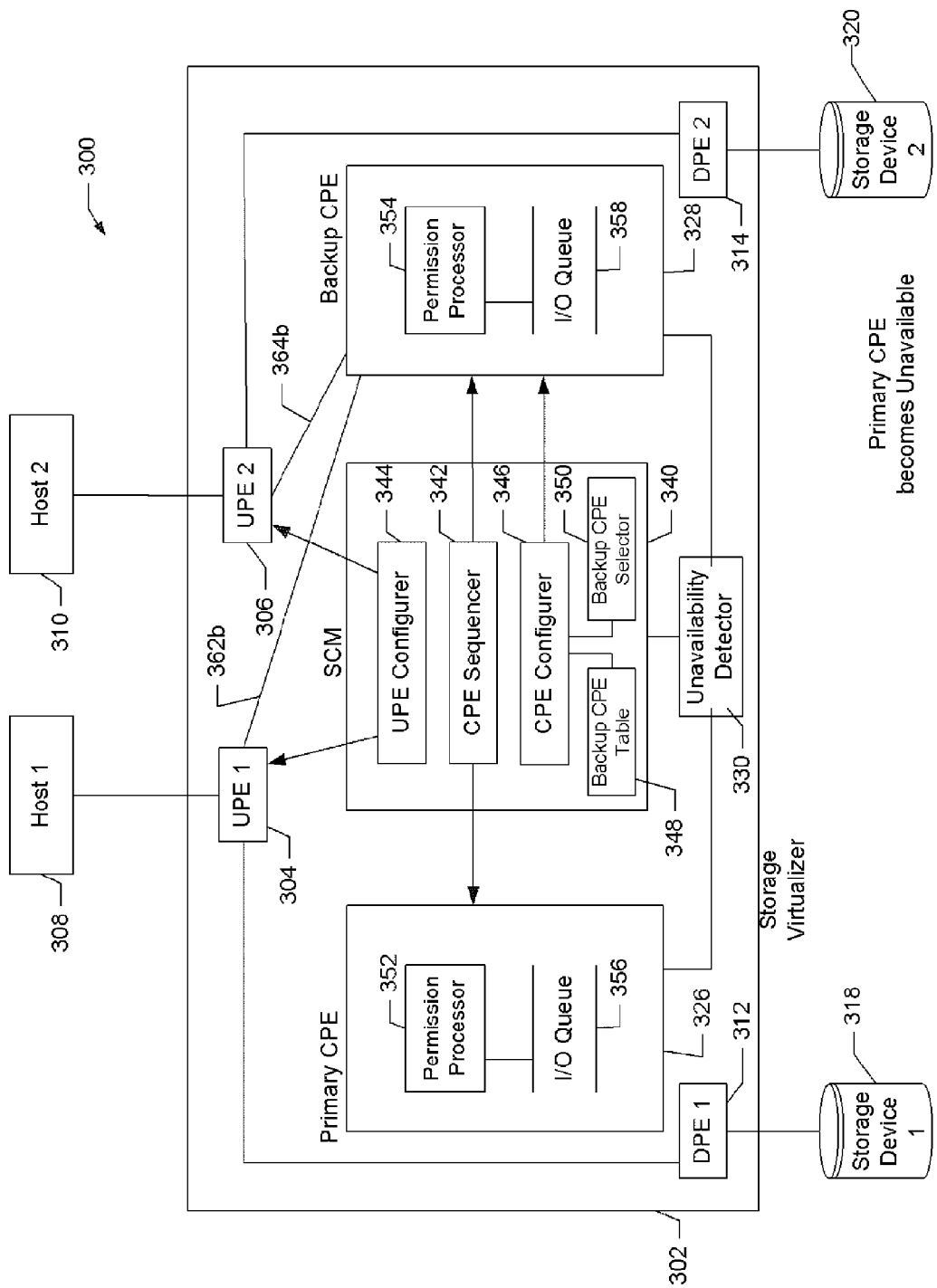
FIG. 4 is a block diagram of the storage virtualization controller of FIG. 3, illustrative of operation after a primary central processing element becomes unavailable.

Considering now the effect of detection of unavailability of the primary CPE 326, and with reference to FIG. 4, when the unavailability detector 330 signals that the primary CPE 326 has become unavailable, and, if the primary CPE 326 is still functional, a CPE sequencer 342 in the storage configuration module 340 sequences the primary CPE 326 to an off-line state. During the sequencing, the primary CPE 326 will reject any further commands sent to it by a UPE 304,306, and complete any pending I/O operations, as will be discussed subsequently in greater detail. After the primary CPE 326 is in the off-line state, a UPE configurer 344 in the storage configuration module 340 decouples the UPEs 304,306 from the primary CPE 326.

The storage configuration module 340 also includes a CPE configurer 346. When the controller arrangement was initially configured, the CPE configurer 346 configured the primary CPE 326 with configuration information for a first subset of VLUNs for which the primary CPE 326 arbitrates access by hosts. The first subset may range between a single VLUN and the total set of VLUNs in the controller arrangement. After unavailability of the primary CPE 326, the CPE configurer 346 configures each backup CPE with configuration information that identifies a second subset of VLUNs for which the backup CPE 328 will arbitrate access by hosts. The configuration information may also include the state to which some or all of this second subset of VLUNs should be initialized. The second subset is a subset of the first subset, and may range between a single VLUN and the total set of VLUNs previously assigned to the primary CPE 326. If the second subset contains fewer than all the VLUNs in the first subset, then at least one other backup CPE will generally be used as well.

After the backup CPE 328 is configured by the CPE configurer 346, the CPE sequencer 342 sequences the backup CPE 328 from an off-line state to an on-line state. After the backup CPE 328 is on-line, the UPE configurer 344 couples to the backup CPE 328 those UPEs which are associated with the VLUNs assigned to the backup CPE 328 (in this example, UPEs 304,306 are coupled to backup CPE 328 via communications links 362*b*,364*b* respectively). This provides the connection for the hosts (in this example, hosts 308,310) to access their VLUNs, with backup CPE 328 now arbitrating access to the storage devices 318,320.

Considering now the operation of the CPE sequencer 342 with respect to the primary CPE 326 in greater detail, and with continued reference to FIG. 4, if the primary CPE 326 is still functional when it becomes unavailable, any pending I/O operations will be completed and the primary CPE 326 will then be placed in the off-line state. Because all I/O operations were completed, hosts 308,310 do not need to perform any error recovery operations, thus simplifying the recovery from unavailability of the primary CPE 326.

However, if the primary CPE 326 is not functional when it becomes unavailable, pending I/O operations associated with primary CPE 326 cannot be completed. In this case, the hosts 308,310 associated with these pending I/O operations will need to perform appropriate error recovery operations, such as retrying another path to the storage device for any previously issued but not executed I/O commands, after the backup CPE 328 is on-line and the appropriate UPEs 304,306 are coupled to the backup CPE 328.

While the invention has been described above in relation to one primary CPE and one backup CPE, it is not so limited. For example, once the function of the primary CPE 326 has been reassigned to the backup CPE 328, the backup CPE 328 may now be considered as a new primary CPE, and an additional backup CPE (not shown) may be used in case of a failure of the original backup CPE 328.

Considering now in further detail the storage configuration module 340, and with continued reference to FIGS. 3 and 4, some embodiments of the storage configuration module 340 include a backup CPE table 348 coupled to the CPE configurer 346. The backup CPE table 348 identifies which CPE(s) in the system is/are the backup CPE(s) for a primary CPE. The backup CPEs in the table 348 are preselected before the primary CPE becomes unavailable. Other embodiments of the storage configuration module 340 include a backup CPE selector 350 coupled to the CPE configurer 346. The backup CPE selector 350 identifies which CPE(s) in the system is/are the backup CPE(s) for a primary CPE. The backup CPEs provided by the selector 350 are dynamically selected when the primary CPE becomes unavailable, typically by balancing the VLUN management load among a number of CPEs in the controller arrangement.

Considering now in further detail the CPEs 326,328, and with continued reference to FIGS. 3 and 4, each CPE 326,328 includes a permission processor 352,354. While the primary CPE 326 is available, the permission processor 352 is coupled to UPEs 304,306. After the primary CPE 326 goes unavailable and the backup CPE 328 is activated, the permission processor 354 is coupled to UPEs 304,306. The active one of the permission processors 352,354 permits the data transfer between one of the hosts 308,310 and one of the storage devices 318,320 by granting exclusive permission to one of the UPEs 304,306 to access the storage device 318,320. Associated with each permission processor 352,354 is a corresponding I/O queue 356,358 containing pending I/O operations. In some situations, the active permission processor cannot immediate grant exclusive access to the requesting UPE, but instead places the permission request in the I/O queue as a pending I/O operation. When it comes time for the pending permission request to be performed the active permission processor grants exclusive access to the requesting UPE to perform the pending I/O operation.

Figure 5:
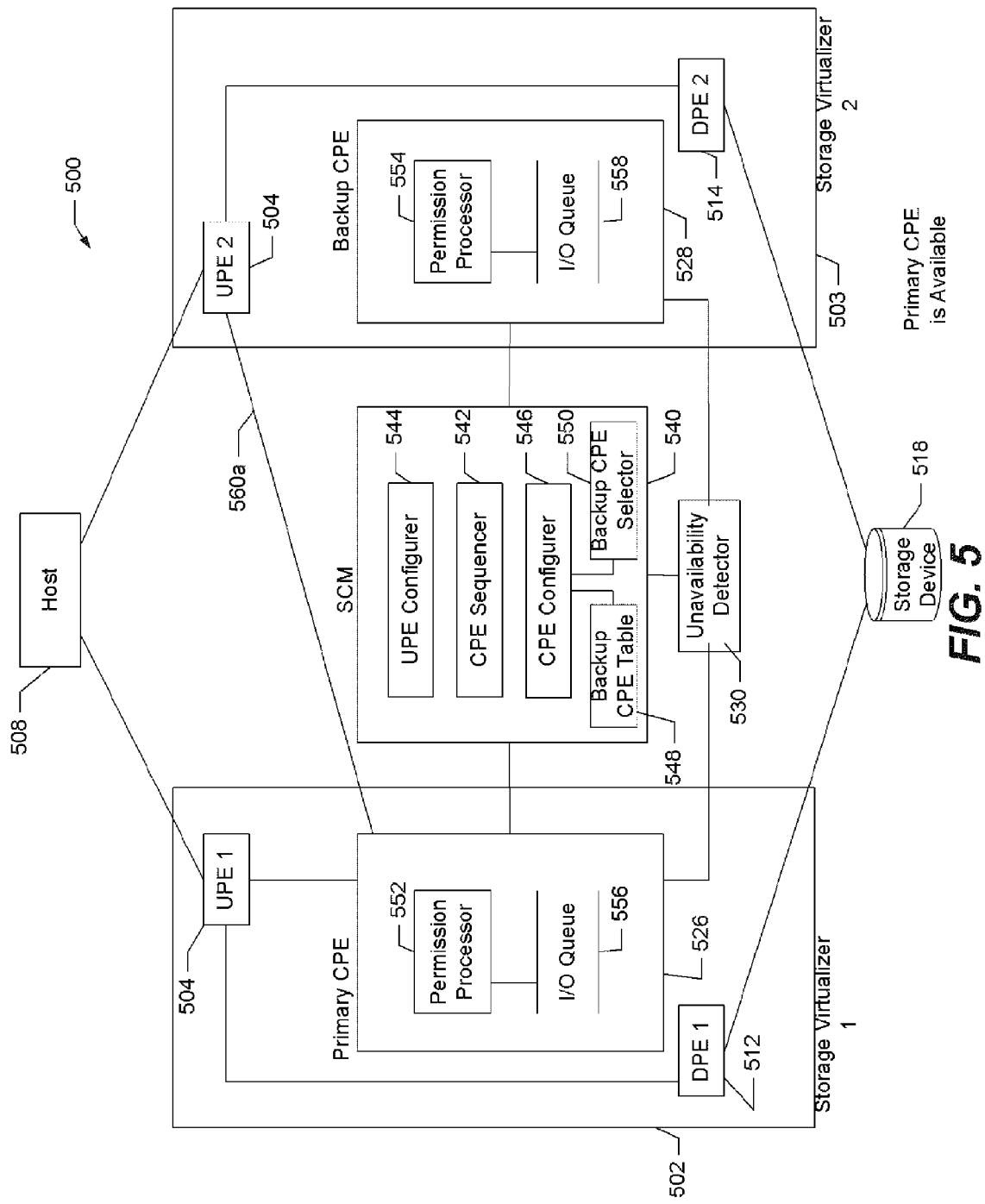
FIG. 5 is a block diagram of a multiple-controller storage virtualization system controller for providing high network availability according to an embodiment of the present invention and usable in the storage networks of FIGS. 1 and 2, illustrative of operation while a primary central processing element in one of the controllers is available.

Considering now in greater detail a storage virtualization system including multiple storage virtualization controllers, and with reference to the SAN 500 of FIG. 5, the exemplary controller arrangement includes two controllers 502,503. A primary CPE 526 is located in controller1 502, while a backup CPE 528 is located in controller2 503. A single host 508 is connected to controller1 502 via UPE1 504, and to controller2 503 via UPE2 504. A single storage device 518 is connected to controller1 502 via DPE1 512, and to controller2 503 via DPE2 514. This results in parallel data paths through different controllers 502,503 from host 508 to storage device 518. Such a configuration can advantageously provide a host with a storage virtualization system of high availability in that, if a failure occurs in one of the controllers 502,503, the host can still communicate with the other controller through the remaining data path. An external communication link interconnecting the controllers 502,503 allows one or more UPEs in one controller to couple to a CPE in a different controller. For example, external communication link 560*a* couples UPE2 504 in controller2 503 to primary CPE 526 in controller1 502.

Figure 6:
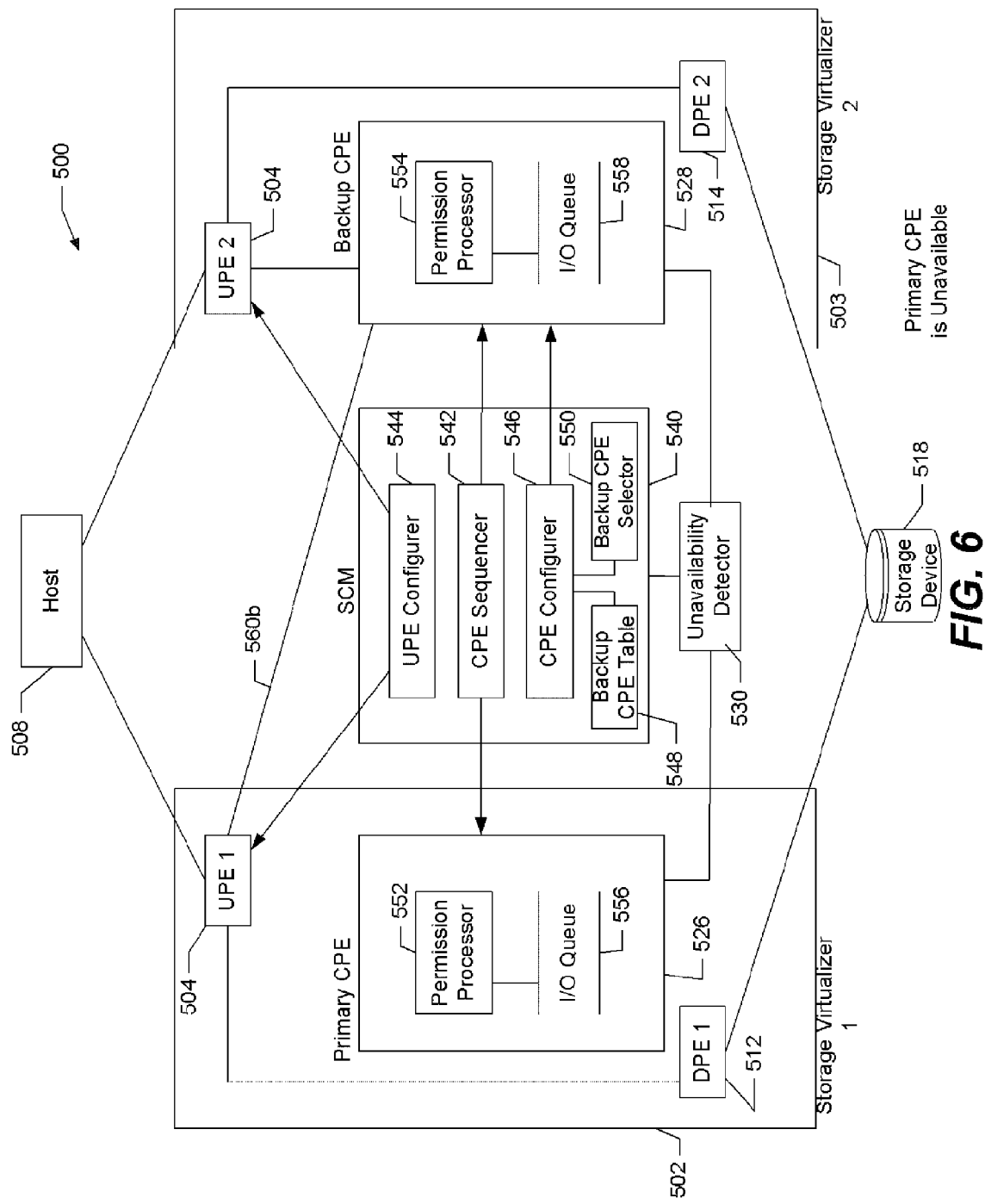
FIG. 6 is a block diagram of the multiple-controller storage virtualization system controller of FIG. 5, illustrative of operation after a primary central processing element in one of the controllers becomes unavailable.

Considering the operation of a high availability configuration in greater detail, and with reference to FIGS. 5 and 6, host 508 may access storage device 518 via either controller1 502 or controller2 503. Requests for access are initially arbitrated by primary CPE 526. If unavailability detector 530 detects that primary CPE 526 becomes unavailable, storage configuration module 540 and its submodules 542-550 function in an analogous manner as has heretofore been described with reference to FIGS. 3 and 4 so as to reassign the function of primary CPE 526 to backup CPE 528, and host 508 may continue to access storage device 518 via controller2 503. Unavailability of primary CPE 526 may result from, among other causes, a power shutdown of controller 502, a general failure of controller 502, or controller 502 being taken off-line as part of an elective shutdown, such as where an operator takes controller 502 out of service. After the function of primary CPE 526 has been reassigned to backup CPE 528, external communication link 560*b* couples UPE1 504 in controller1 502 to backup CPE 528 in controller2 503.

Considering now in further detail the storage configuration module, and with reference to FIGS. 3 and 5, a user (not shown) may interact with the controller (either directly through a user interface provided by the storage configuration module 350,550, or through other mechanisms) to provide configuration information, such as defining the mapping of VLUNs to LUNs on storage devices 318,320,518. The configuration may be in accordance with user-defined profiles, and can implement desired storage topologies such as mirroring, striping, replication, clustering, and the like. The configuration information may also specify the content of the backup CPE table 348,548, and load balancing rules for backup CPE selector 350,550. At least some of the configuration information is used by the CPE configurer 346,546 to perform its heretofore-described operation. The storage configuration module may be located within a controller (such as storage configuration module 350 within controller 302) or elsewhere in the storage virtualization system (such as storage configuration module 550).

It should be noted that the various processing elements (CPE, DPE, UPE, SCM, etc.) of the storage virtualization controllers can be implemented using a variety of technologies. In some implementations, each element may include a separate processor, with processing logic implemented either in firmware, software, or hardware. In other implementations, multiple elements may be implemented as separate processes performed by a single processor through techniques such as multitasking. In still other implementations, one or more custom ASICs may implement the elements.

Figure 7:
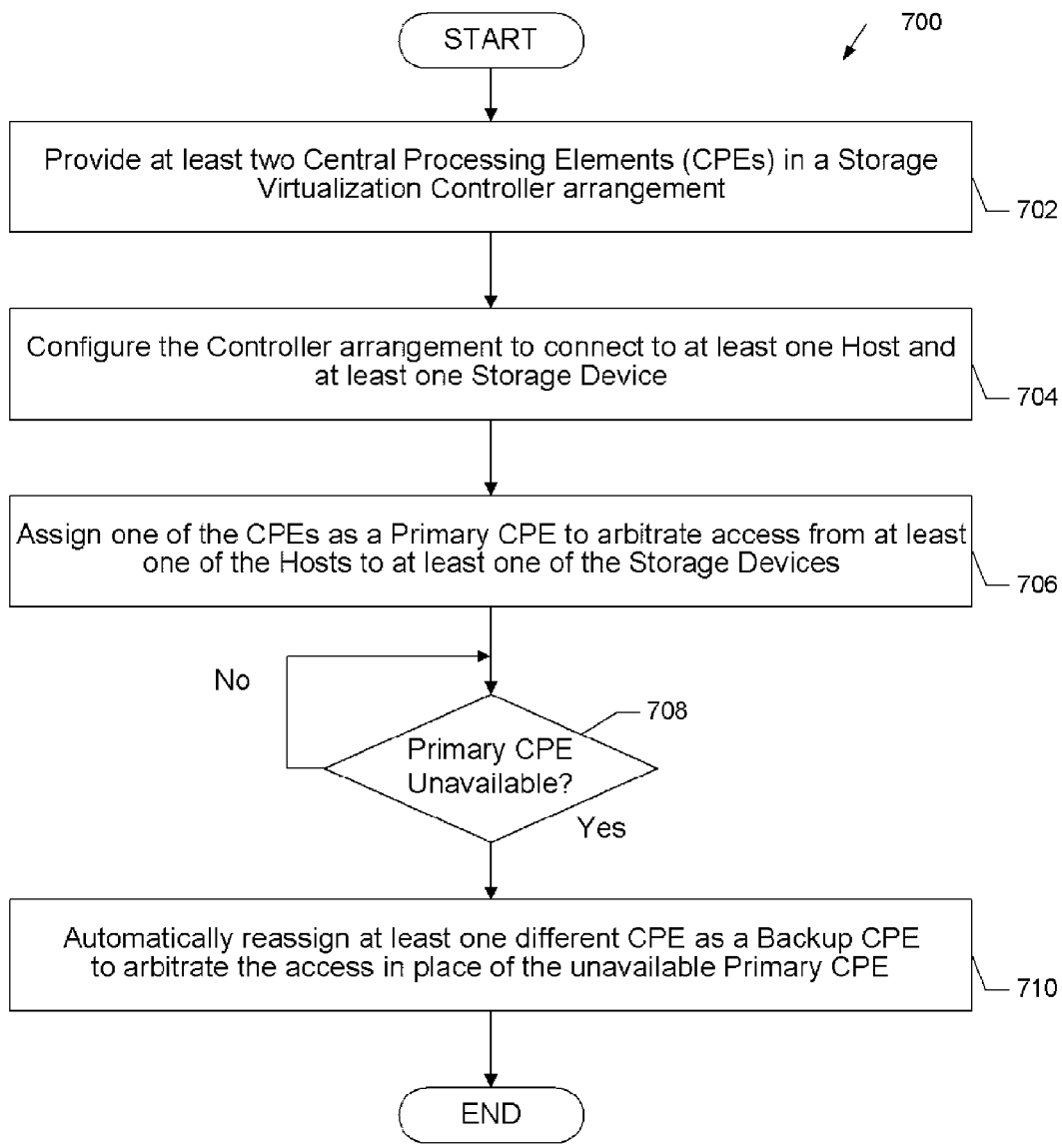
FIG. 7 is a flowchart of a method for operating a storage virtualization controller arrangement according to an embodiment of the present invention.

Another embodiment of the present invention, as best understood with reference to FIG. 7, is a method 700 for operating a storage virtualization controller arrangement. The method begins at 702 by providing a storage virtualization controller arrangement having at least two central processing elements. At 704, the controller arrangement is configured to connect to at least one host and at least one storage device. At 706, one of the central processing elements is assigned as a primary central processing element to arbitrate access from at least one of the hosts to at least one of the storage devices. While the primary CPE is available ("No" branch of 708), the primary CPE arbitrates the access. If and when the primary CPE becomes unavailable ("!Yes"! branch of 708), then at 710 at least one different one of the central processing elements is automatically reassigned as a backup central processing element to arbitrate the access from the hosts to the storage devices.

Figure 8:
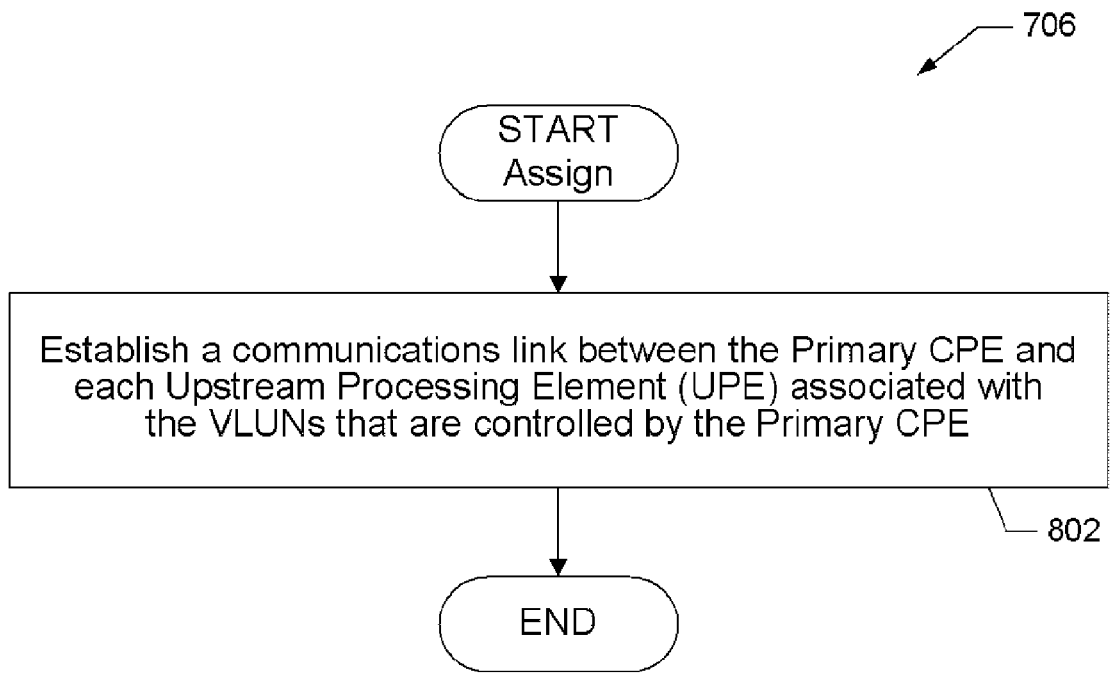
FIG. 8 is a lower-level flowchart according to an embodiment of the present invention of a portion of the method of FIG. 7 for assigning a primary central processing element.

Considering now in further detail the assigning 706 of one of the CPEs as the primary CPE, and with reference to FIG. 8, as part of the assigning 706 a communication link is established at 802 between the primary CPE and each upstream processing element associated with the VLUNs that are controlled by the primary CPE. The hosts connected to these UPEs are the hosts to which the storage virtualization controller arrangement provides one or more of these VLUNs. If the CPE and the UPE are located in different controllers, the different controllers are communicatively coupled to each other via an external communications link.

Figure 9:
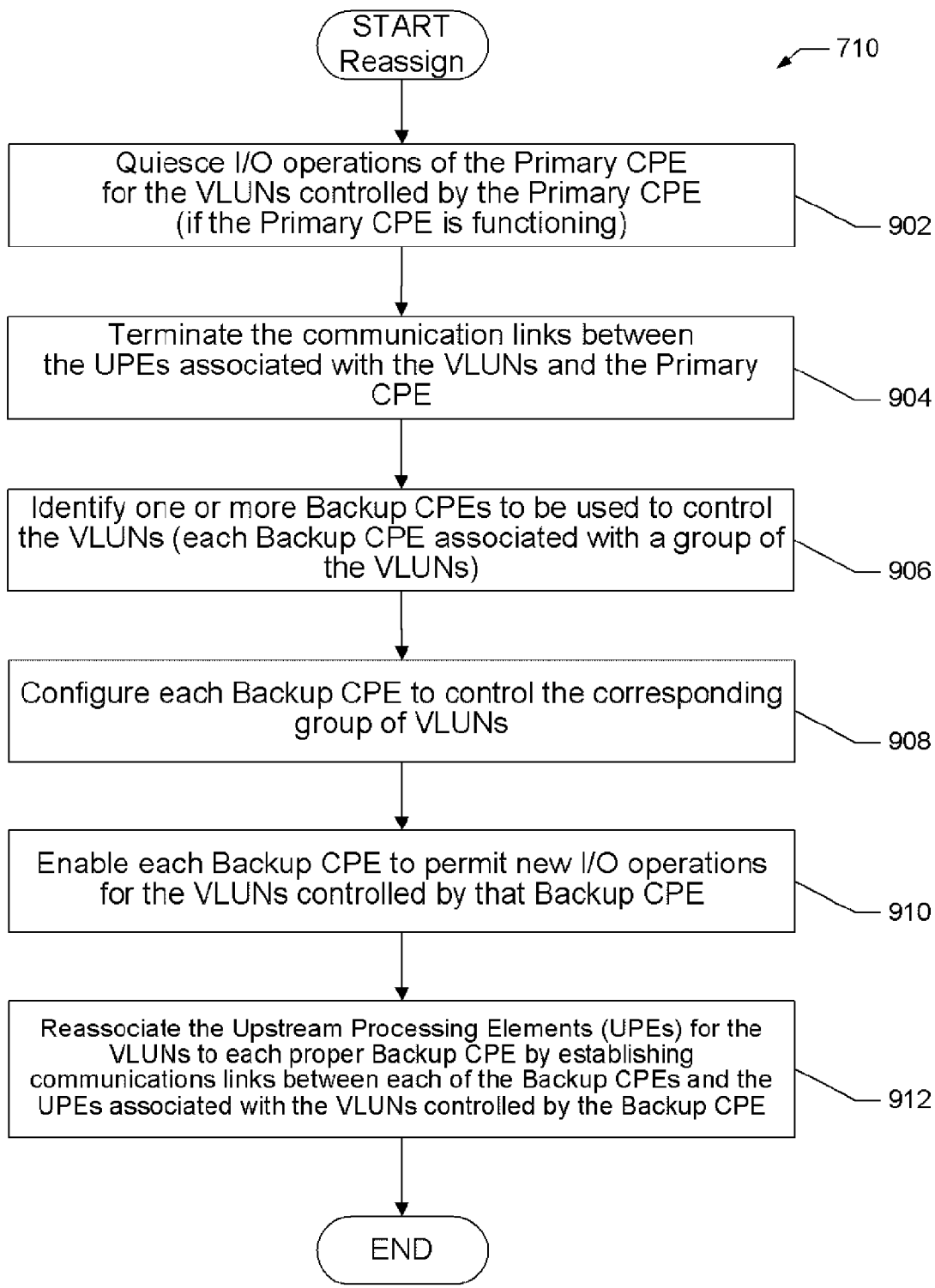
FIG. 9 is a lower-level flowchart according to an embodiment of the present invention of a portion of the method of FIG. 7 for reassigning a backup central processing element to replace the primary central processing element.

Considering now in further detail the automatic reassigning 710 of at least one different CPE as a backup CPE, and with reference to FIG. 9, as part of the reassigning 710, control of the VLUN associated with the primary CPE are transferred to at least one backup central processing element of the storage virtualization controller arrangement. At 902, I/O operations of the primary CPE are quiesced for the VLUNs controlled by the primary CPE, if the primary CPE is still functioning when the reassigning is performed. For example, if the unavailability occurs because of an elective shutdown of one controller in a multiple controller arrangement that is taken out of service by an operator, the primary CPE will typically still be functioning and the quiescing 902 will be performed. However, if a power failure occurs on a controller, typically the primary CPE will no longer be functioning, and the quiescing 902 will not be performed. At 904, the communications links between the primary CPE and the UPEs associated with the VLUNs that are controlled by the primary CPE are terminated. At 906, one or more backup CPEs to be used to control these VLUNs are identified. A single backup CPE to controls all these VLUNs may replace the primary CPE, or these VLUNs may be divided into groups and control of each group divided among multiple backup CPEs. At 908, each backup CPE is configured to control the corresponding group of VLUNs. Configuration information, as heretofore described, about the VLUNs in each group is supplied to the corresponding backup CPE. At 910, each backup CPE is enabled to permit new I/O operations for the VLUNs controlled by that backup CPE. At 912, the UPEs associated with the VLUNs are reassociated from the primary CPE to the corresponding backup CPE by establishing a communications link between the UPEs and the backup CPEs, and the automatic reassigning 710 concludes. If the CPE and the UPE are located in different controllers, the different controllers are communicatively coupled to each other via an external communications link.

Figure 10:
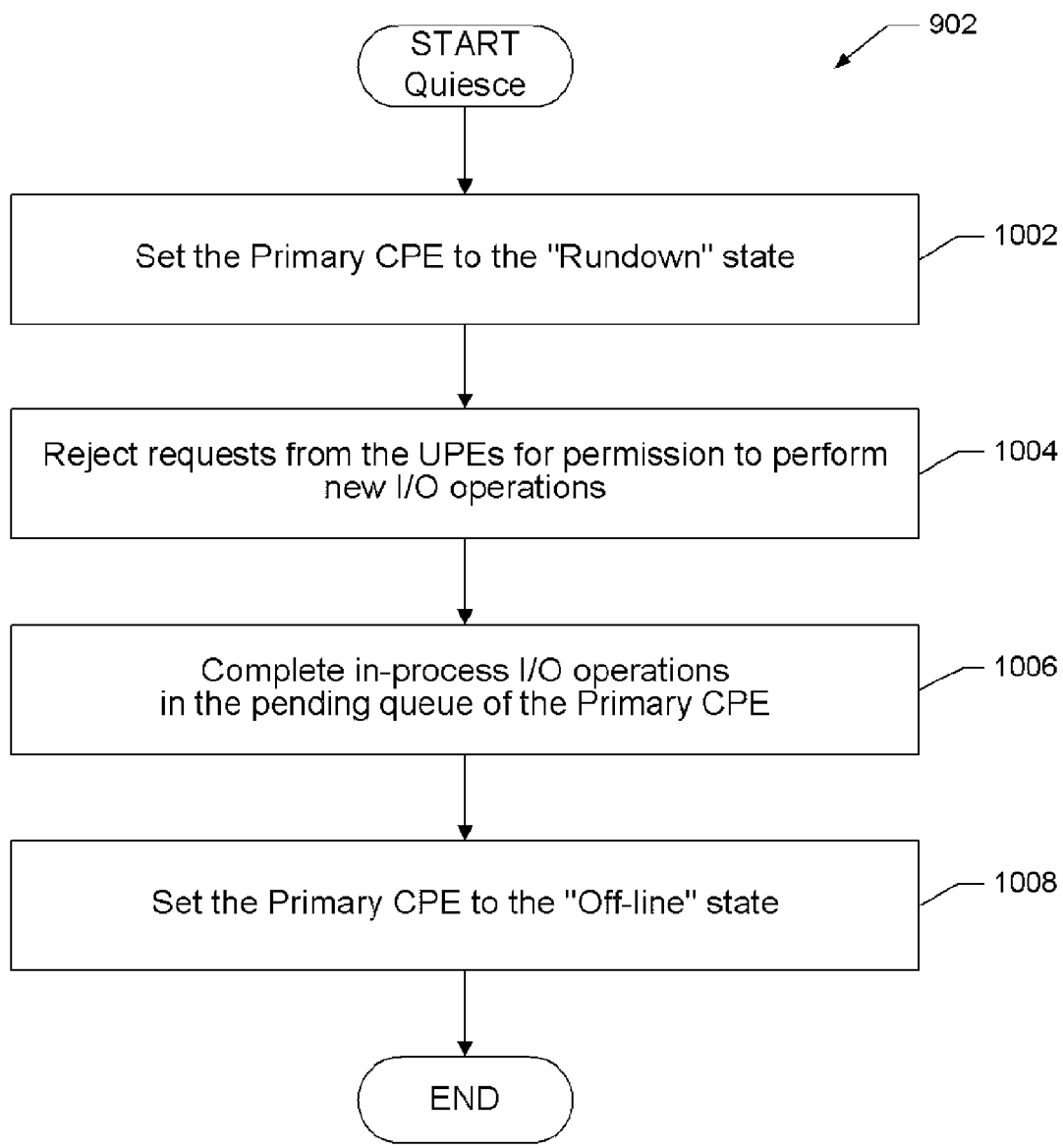
FIG. 10 is a lower-level flowchart according to an embodiment of the present invention of a portion of the method of FIG. 9 for quiescing I/O operations of the primary central processing element.

Considering now in further detail the quiescing 902 of the I/O operations, and with reference to FIG. 10, as part of the quiescing 902 the primary CPE is set to the "rundown" state at 1002. At 1004, requests from UPEs for permission to perform new I/O operations are rejected by the primary CPE. At 1006, in-process I/O operations in the pending queue of the primary CPE are completed. At 1008, the primary CPE is set to the "off-line" state, and the quiescing 902 concludes.

Figure 11:
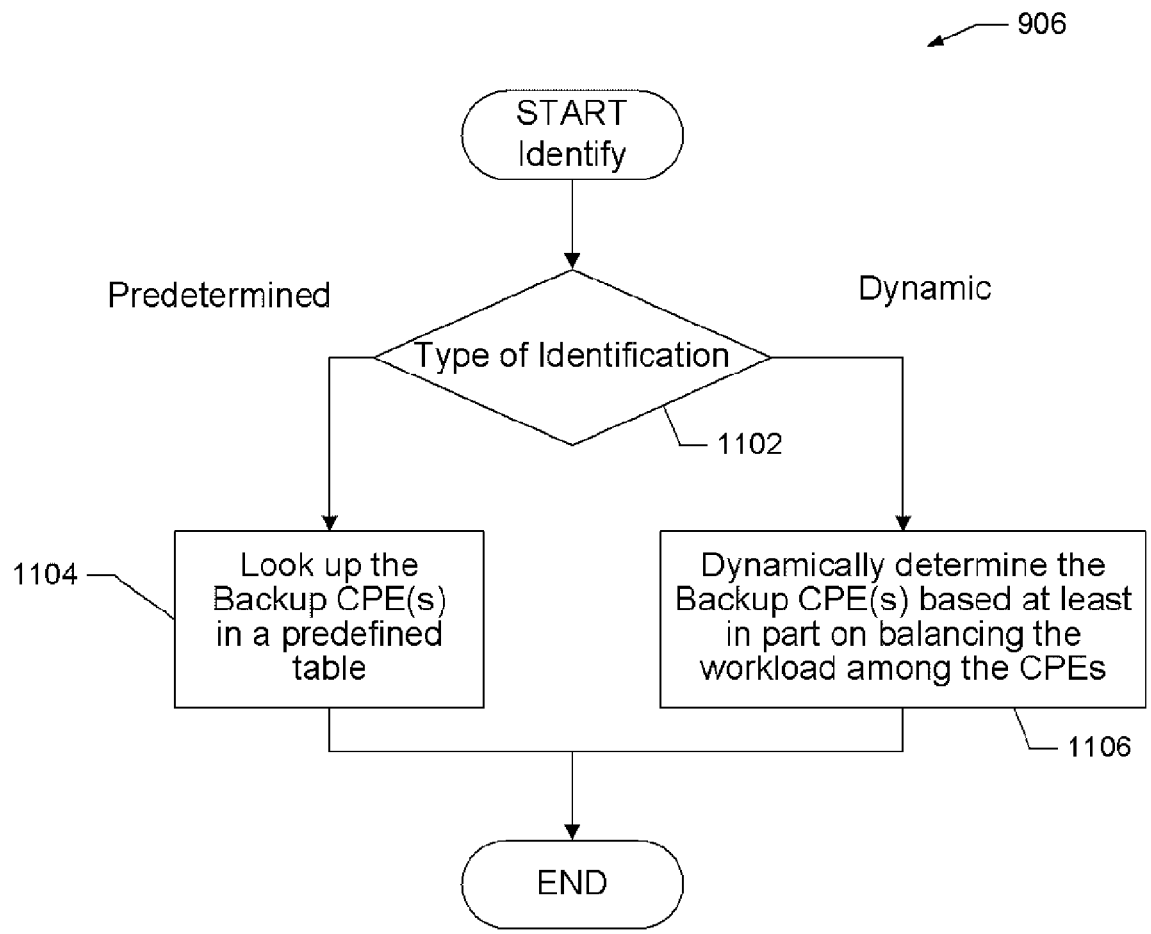
FIG. 11 is a lower-level flowchart according to an embodiment of the present invention of a portion of the method of FIG. 9 for identifying the backup central processing element.

Considering now in further detail the identifying 906 of the backup CPEs, and with reference to FIG. 11, as part of the identifying 906 the type of identification is determined at 1102. If the backup CPEs for the primary CPE are determined in advance ("Predetermined" branch of 1102), then at 1104 the backup CPEs are looked up in a predefined table or similar data structure. If the backup CPEs are determined at the time of unavailability ("Dynamic" branch of 1102), then at 1106 the backup CPEs are determined dynamically based at least in part on balancing the workload among the available CPEs in the controller arrangement.

Figure 12:
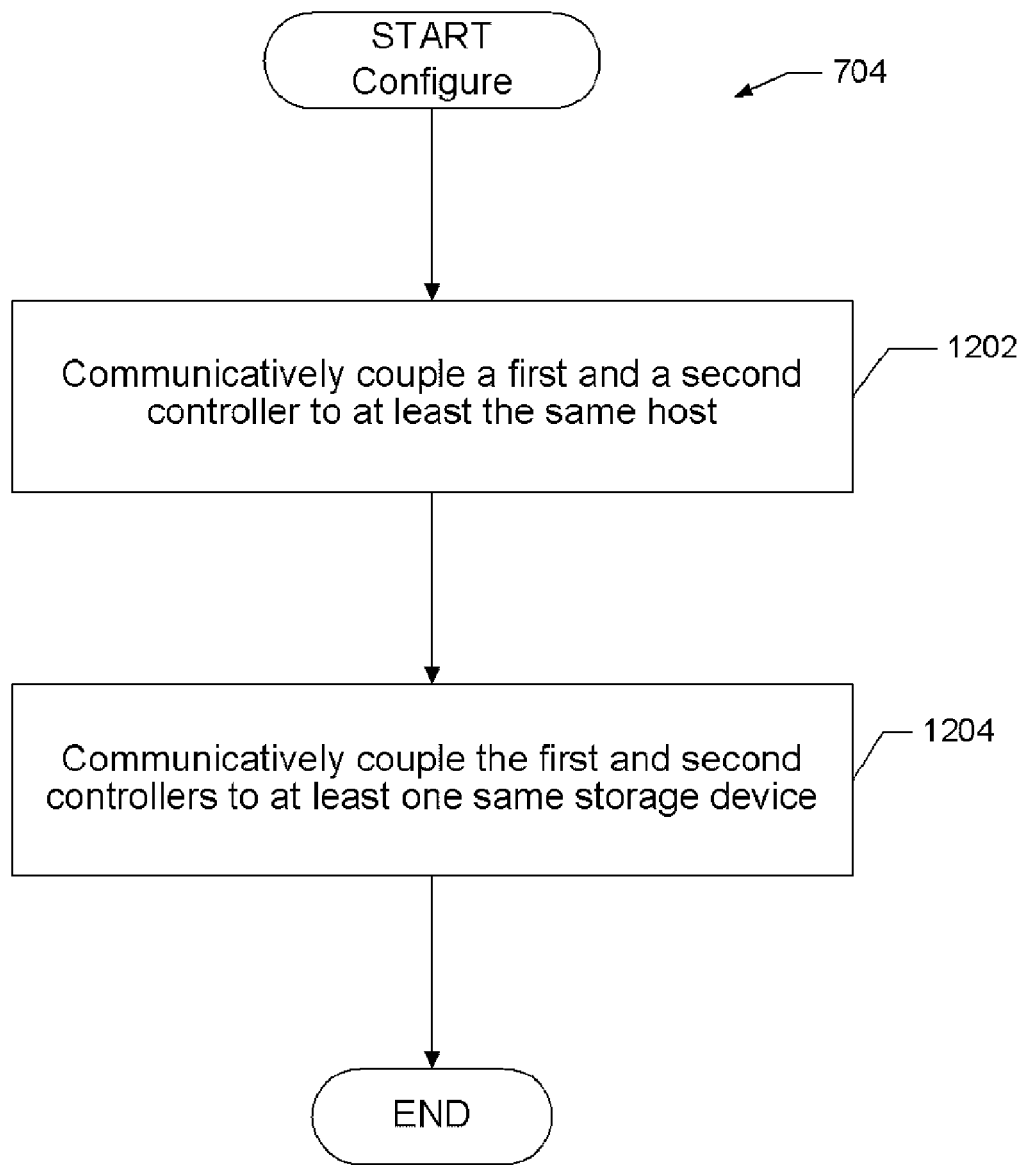
FIG. 12 is a lower-level flowchart according to an embodiment of the present invention of a portion of the method of FIG. 7 for configuring the controller arrangement to provide high availability.

Considering now in further detail the configuring 704 of the controller arrangement to connect to at least one host and at least one storage device, and with reference to FIG. 12, some controller arrangements, in particular a high availability controller arrangement as has been previously discussed with reference to FIGS. 5 and 6, utilize multiple storage virtualization controllers to provide separate parallel data paths. For such an arrangement and as part of the configuring 704, at 1202 a first controller and a second controller are communicatively coupled to at least one same host. At 1204, the first controller and the second controller are communicatively coupled to at least one same storage device. As a result, two separate data paths are provided from the host to the storage device to provide the host with continued access to the storage device even if one of the controllers becomes entirely unavailable.

From the foregoing it will be appreciated that the storage virtualization controller arrangement system, and methods provided by the present invention represent a significant advance in the art. Although several specific embodiments of the invention have been described and illustrated, the invention is not limited to the specific methods, forms, or arrangements of parts so described and illustrated. For example, the invention is not limited to storage systems that use SCSI storage devices, nor to networks utilizing fibre channel protocol. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method for operating a storage virtualization controller arrangement, comprising:

providing at least two central processing elements both designed with the same functionality of arbitrating access between at least one host and at least one storage device disposed within the storage virtualization controller arrangement to facilitate an in-band storage virtualization configuration;

configuring the storage virtualization controller arrangement to connect at least one host and at least one storage device through the storage virtualization controller arrangement and the at least two central processing elements wherein the storage virtualization controller arrangement is distinct from both the at least one host and the at least one storage device and uses features of the in-band storage virtualization configuration to perform both data transfer and communication over the access arbitrated between the at least one host and at least one storage device;

assigning one of the at least two central processing elements within the storage virtualization controller arrangement, distinct from both the at least one host and the at least one storage device, as a primary central processing element to arbitrate access from the at least one host to the at least one storage device; and upon detection of an unavailability of the primary central processing element within the storage virtualization controller arrangement yet distinct from both the at least one host and the at least one storage device, automatically reassigning at least one of the at least two different one of the central processing elements as a backup central processing element within the storage virtualization controller to arbitrate the access from the at least one host to the at least one storage device using features of the in-band storage virtualization configuration.

2. The method of claim 1, wherein the controller arrangement is a single controller.

3. The method of claim 1, wherein the configuring includes:

connecting individual ones of the at least one host and the at least one storage device to the storage virtualization system via a connection method taken from a group consisting of a direct point-to-point connection and a switching network connection.

4. The method of claim 1, wherein the unavailability results from a failure of the primary central processing element.

5. The method of claim 1, wherein the storage virtualization controller arrangement includes an upstream processing element adapted to connect to the host, the assigning further including:

establishing a communication link between the primary central processing element and the upstream processing element.

6. The method of claim 5, wherein the controller arrangement includes at least two controllers, wherein the upstream processing element is disposed in a first controller, and wherein at least one of the primary central processing element and the backup central processing element is disposed in a second controller.

7. The method of claim 6, wherein the unavailability results from an event selected from the group consisting of a failure condition of the controller in which the primary central processing element is disposed, and an elective shutdown of the controller in which the primary central processing element is disposed.

8. The method of claim 6, further comprising:

communicatively coupling tire first controller arid the second controller to at least one same one of the at least one host; and communicatively coupling the first controller and the second controller to at least one same one of the at least one storage device, so as to provide two separate paths from the at least one same one of the at least one host to the at least one same one of the at least one storage device.

9. The method of claim 5, wherein the reassigning further comprises:

the primary central processing element rejecting a request from the upstream processing element for permission to perform an I/O command.

10. The method of claim 1, wherein the primary central processing element includes a pending queue of I/O commands, the reassigning further comprising:

the primary central processing element executing the pending queue of I/O commands.

11. The method of claim 5, wherein the reassigning further comprises:

terminating the communication link between the primary central processing element and the upstream processing element; and establishing a communication link between the backup central processing element and the upstream processing element.

12. The method of claim 1, wherein the reassigning further comprises:

predetermining the at least one different one of the central processing elements before the unavailability occurs.

13. The method of claim 1, wherein the reassigning further comprises:

determining the at least one different one of the central processing elements after the unavailability occurs.

14. The method of claim 13, wherein the determining includes:

balancing a workload among the available ones of the at least two central processing elements in the controller arrangement.

15. A storage virtualization controller arrangement, comprising:

means for providing at least two central processing elements both designed with the same functionality of arbitrating access between at least one host and at least one storage device disposed within the storage virtualization controller arrangement to facilitate an in-band storage virtualization configuration:

means for configuring the storage virtualization controller arrangement to connect at least one host and at least one storage device through the storage virtualization controller arrangement and the at least two central processing elements wherein the storage virtualization controller arrangement is distinct from both the at least one host and the at least one storage device and uses features of the in-band storage virtualization configuration to perform both data transfer and communication over the access arbitrated between the at least one host and at least one storage device;

means for assigning one of the at least two central processing elements within the storage virtualization controller arrangement and distinct from both the at least one host and the at least one storage device as a primary central processing element to arbitrate access from the at least one host to the at least one storage device; and means for automatically reassigning at least one of the at least two different one of the central processing elements as a backup central processing element within the storage virtualization controller to arbitrate the access from the at least one host to the at least one storage device using features of the in-band storage virtualization configuration upon detection of an unavailability of the primary central processing element.

16. A computer program product stored on a computer readable storage medium encoded with instructions for operating a storage virtualization controller arrangement, comprising instructions in the computer program product operable to cause a programmable processor to:

provide at least two central processing elements both designed with the same functionality of arbitrating access between at least one host and at least one storage device disposed within the storage virtualization controller arrangement for an in-band storage virtualization configuration;

configure the storage virtualization controller arrangement to connect at least one host and at least one storage device through the storage virtualization controller arrangement and the at least two central processing elements wherein the storage virtualization controller arrangement is distinct from both the at least one host and the at least one storage device and uses features of the in-band storage virtualization configuration to perform both data transfer and communication over the access arbitrated between the at least one host and at least one storage device;

assign one of the at least two central processing elements within the storage virtualization controller arrangement and distinct from both the at least one host and the at least one storage device as a primary central processing element to arbitrate access from the at least one host to the at least one storage device; and upon detection of an unavailability of the primary central processing element within the storage virtualization controller arrangement yet distinct from both the at least one host and the at least one storage device, automatically reassign at least one of the at least two different one of the central processing elements as a backup central processing element within the storage virtualization controller to arbitrate the access from the at least one host to the at least one storage device using features of the in-band storage virtualization configuration.

17. The computer program product of claim 16. wherein the controller arrangement is a single controller.

18. The computer program product of claim 16, wherein the configuring further includes instructions that:

connect individual ones of the at least one host and the at least one storage device to the storage virtualization system via a connection method taken from a group consisting of a direct point-to-point connection and a switching network connection.

19. The computer program product of claim 16, wherein the unavailability results from a failure of the primary central processing element.

20. the computer program product of claim 16, wherein the storage virtualization controller arrangement includes an upstream processing element adapted to connect to the host and the instructions that assign further includes instructions that:

establish a communication link between the primary central processing element and the upstream processing element.

* * * * *